United States Patent [19]

Reda

[11] 3,786,721

[45] Jan. 22, 1974

[54] CLAMP FOR ROTARY TABLES

[75] Inventor: Kazimierz J. Reda, Trumbull, Conn.

[73] Assignee: The Producto Machine Company, Bridgeport, Conn.

[22] Filed: Sept. 9, 1971

[21] Appl. No.: 179,005

[52] U.S. Cl. ............... 90/58 B, 29/1 A, 51/240 R, 74/813 L, 408/71
[51] Int. Cl. ............................................. B23c 1/14
[58] Field of Search ...... 90/58 R, 58 B, 58 C, 56 R; 408/71; 51/240 R, 240 A; 74/826, 813 L; 29/1 A

[56] References Cited
UNITED STATES PATENTS

| | | | |
|---|---|---|---|
| 2,135,639 | 11/1938 | Gorman | 74/826 |
| 1,515,591 | 11/1924 | Canner | 74/826 X |
| 3,618,427 | 11/1971 | Schoepe | 74/813 L X |
| 2,952,894 | 9/1960 | Waninger | 29/1.5 |
| 2,532,046 | 11/1950 | Walter | 29/1.5 |

Primary Examiner—Gil Weidenfeld
Attorney, Agent, or Firm—Armand Cifelli

[57] ABSTRACT

A clamping apparatus for clamping a rotary table assembly, particularly when it is incorporated into a numerically controlled machine tool system where maintaining a static position without influencing table orientation is especially desirable. The clamping apparatus includes opposed clamping jaws which engage an annular clamping ring disposed on the rotary table. The clamping jaws apply essentially equal and opposite clamping forces to each side of the clamping ring to clamp the table without influencing the loading thereof in any direction. The gripping action of the clamping jaws is actuated by a levered linkage to attain a considerable mechanical advantage which thereby reduces the size and the expense of the apparatus and simplifies its incorporation into rotary table assemblies. Furthermore, the clamping apparatus is designed as an overcenter device so that when it is in its clamped position a positive force is required to unclamp it. This provides fail safe operation inasmuch as failure of the clamp actuating device does not release the holding forces.

3 Claims, 4 Drawing Figures

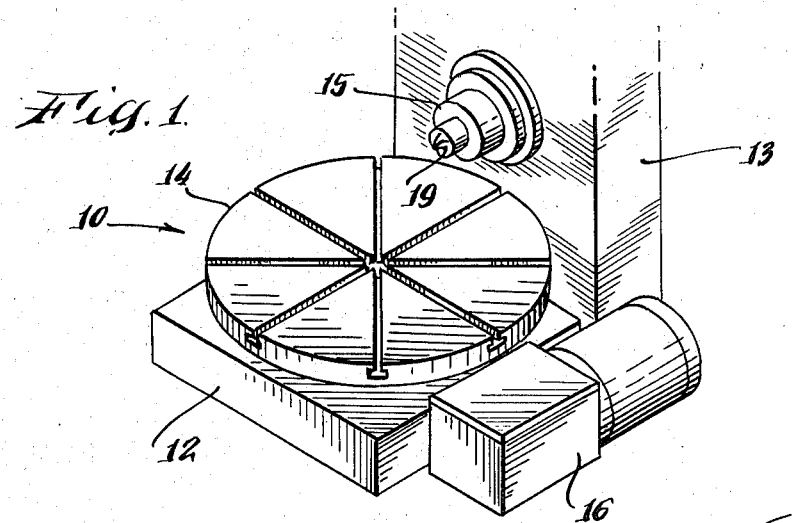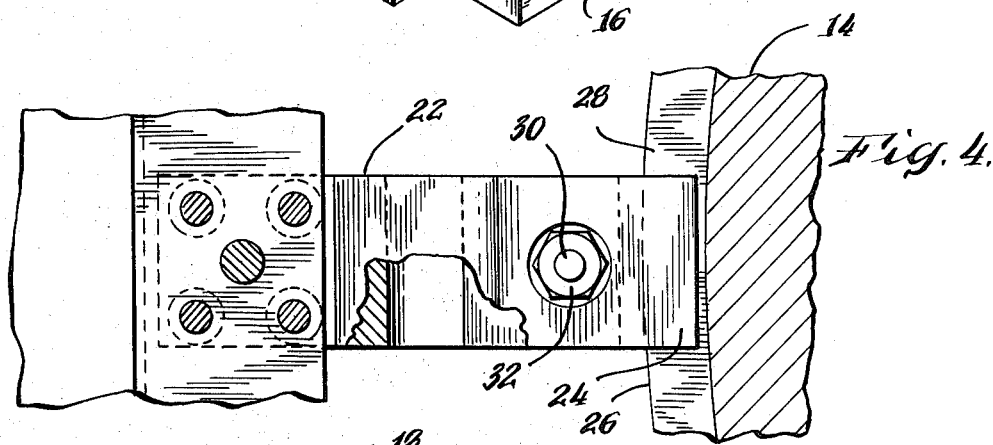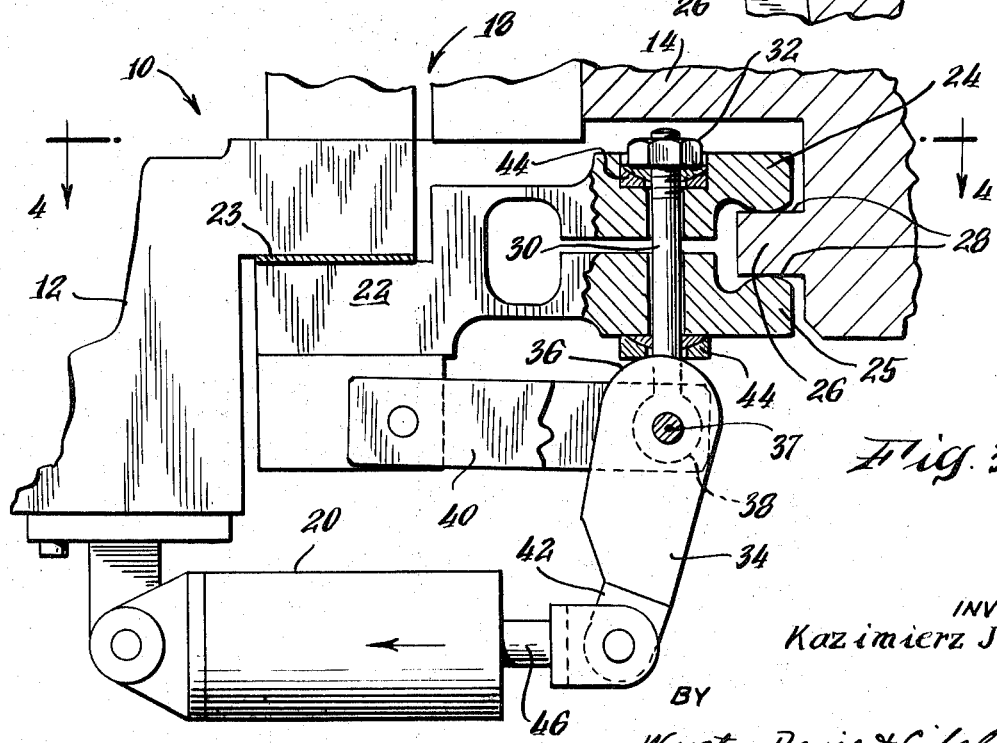

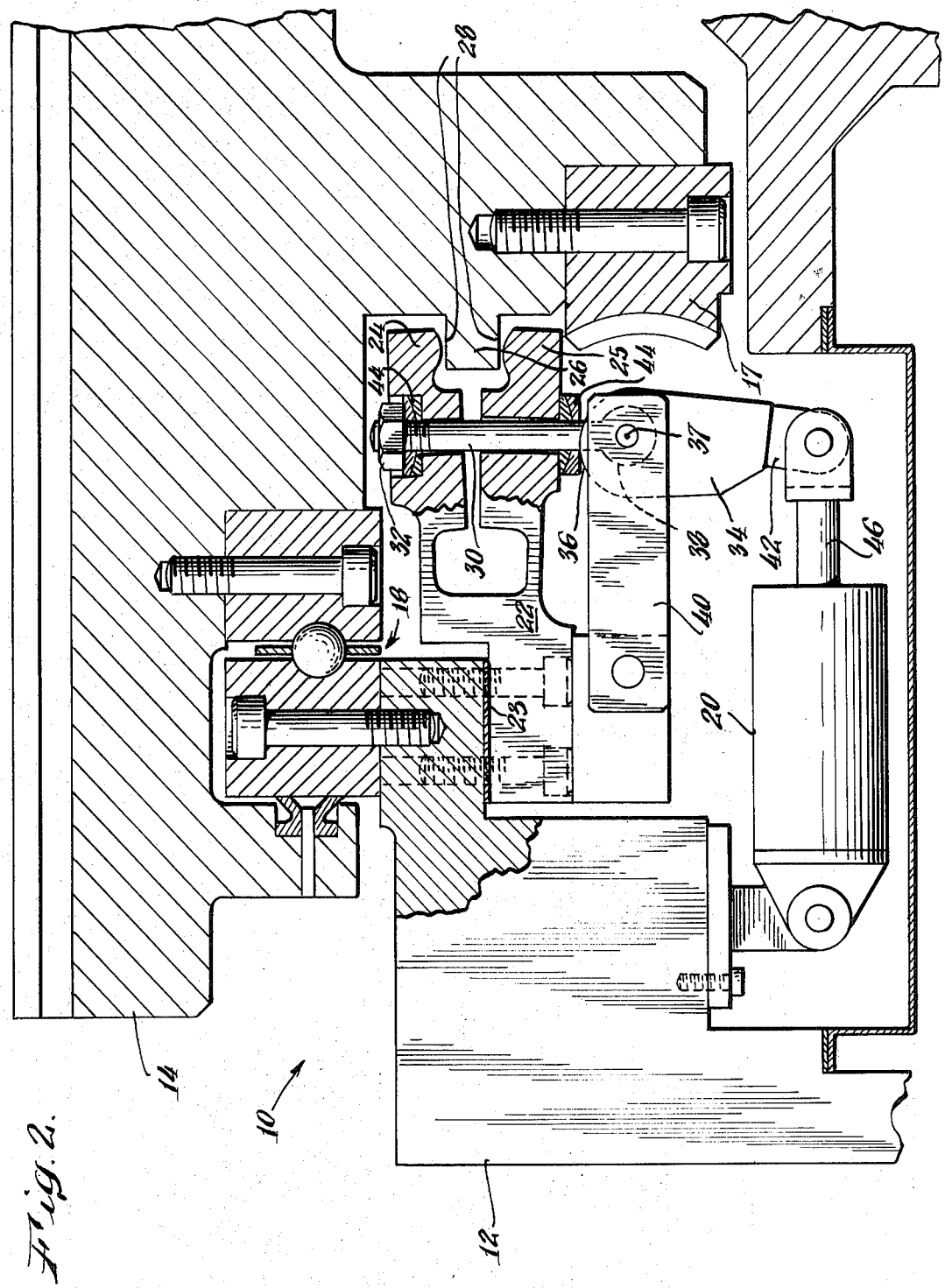

CLAMP FOR ROTARY TABLES

BACKGROUND OF THE INVENTION

The present invention relates to clamping apparatus, and more particularly, to clamping apparatus for clamping a rotary table, such as one operating under numerical control.

Hitherto, many different clamping devices have been used to clamp rotary table assemblies. In most of these devices, however, a unidirectional force is applied to a single sided surface which tends to influence the table loading and its orientation in the direction of the clamping force, thereby making precise positioning difficult to achieve. This is an especially acute problem when the table is being used with numerical controlled machine tools where precision positioning of the table is essential. Furthermore, these prior art devices usually incorporate an actuating arrangement which requires that an actuating force be applied at all times when clamping is desired. Thus if the actuator fails the clamping forces are released which could result in damage to the workpiece or machine tool. Finally, the prior art devices have typically developed only a nominal mechanical advantage and therefore are bulky in size, expensive to manufacture, and awkward to incorporate within prescribed space limitations.

SUMMARY OF THE INVENTION

These problems and disadvantages are overcome by the present invention by providing an improved clamping apparatus having a double sided clamping surface on the rotary table and applying thereto, equal and opposite clamping forces to each side thereof. The clamping forces are the result of a linkage which permits the application thereof by an actuating force applied through a lever arm and thereby attains a relatively high mechanical advantage. In addition fail safe operation is provided by arranging the clamping apparatus to be clamped in position so that failure of the actuating device does not open the clamp.

It is therefore a general object of the present invention to provide a clamping apparatus for a rotary table assembly which minimizes and obviates the disadvantages of the prior art.

It is a specific object of the present invention to provide a non-influencing clamping apparatus for a rotary table assembly.

It is a more specific object of the present invention to provide a clamping apparatus for a rotary table which does not influence its loading or orientation.

It is another object of the present invention to provide a clamping apparatus which maintains the clamping forces after the actuating source has failed.

It is still another object of the present invention to provide a clamping appatatus which requires actuating forces when passing from a clamped position to the unclamped position.

It is a further object of the present invention to provide a clamping apparatus which develops a relatively high mechanical advantage.

It is still a further object of the present invention to provide a clamping apparatus which can be actuated with minimum force.

It is another object of the present invention to provide a clamping apparatus which is of minimum bulk in size.

It is another object of the present invention to provide a clamping apparatus which is of minimum expense to manufacture.

It is still another object of the present invention to provide a clamping apparatus which operates to automatically compensate for wear on the clamping jaws or surfaces.

It is a further object of the present invention to provide a clamping apparatus which occupies a minimum amount of space.

BRIEF DESCRIPTION OF DRAWINGS

The manner in which these and other objects of the invention are achieved will be best understood by reference to the following description, the appended claims, and the Figures of the attached drawings wherein:

FIG. 1 is a perspective view of a machine tool apparatus being used with a rotary table assembly incorporating the clamping apparatus of the present invention;

FIG. 2 is a partial section of the rotary table assembly illustrating the clamping apparatus in the unclamped position;

FIG. 3 is a partial section of the rotary table assembly illustrating the clamping apparatus in the clamped position; and FIG. 4 is a section taken substantially along the line 4—4 of FIG. 3 showing the top view of the clamp utilized in the clamping apparatus.

DESCRIPTION OF THE PREFERRED EMBODIMENT

Turning now to the drawings and more particularly to FIG. 1, there is given a general illustration of a rotary table assembly 10 which incorporates the non-influencing clamping apparatus of the present invention and has been set up for use with a machine tool apparatus 13. The machine tool apparatus 13 is inherently capable of driving a chuck spindle 15 which holds a tool bit 19. Characteristically, the rotary table assembly 10 includes a spindle table 14 rotatably mounted to a table base 12 and driven by a table drive assembly 16.

As shown in FIG. 2, a bearing assembly 18 is utilized to permit the rotary movement of the spindle table 14 while serving as a supporting interface between the spindle table 14 and the table base 12. An annular gear 17 for transmitting rotary motion from the drive assembly 16 is connected to the spindle table 14 by suitable means or may be integrally formed therewith.

Machining operations are performed by the tool bit 19 on any workpiece secured to the spindle table 14 and all surfaces of the workpiece, peripheral to the rotary axis of the spindle table 14, can be presented for machining by rotating the spindle table 14 to the appropriate position. Rotation of the spindle table 14 may be facilitated by applying numerical control apparatus to the table drive assembly 16.

Incorporation of the non-influencing clamping apparatus can best be understood by reference to FIGS. 2, 3, and 4 where a clamp 22 is mounted to the table base 12 using suitable means. The clamp 22 is made of resilient material and is slotted for part of its length to provide two identical deflectable members, the ends of which are shaped to form a set of opposing jaws made up of an upper jaw 24 and a lower jaw 25. A relief cavity may be utilized at the origin of the slot to control the deflection characteristics of the members and the gripping surface of each jaw may be contoured to concentrate the forces applied thereby. A shimstack 23 is used in mounting the clamp 22 so as to juxtaposition the lower jaw 25 and the upper jaw 24 about an annular clamping ring 26, which is integrally formed as part of the spindle table 14. Alternatively the clamping ring 26 may be a separate unit secured to the spindle table 14 by suitable means.

An eyebolt 30 is inserted through mutually aligned apertures in the deflectable members of the clamp 22 adjacent to the clamping jaws 24 and 25, and is secured therein by a nut 32 with spherical washers 44 interfacing the surface of the clamp 22 with both the eye 38 of the eyebolt 30 at one end and the nut 32 at the other end. A cam clevis 34 is pivotally secured by a suitable means to both the eye 38 and an aperture in a rigid link 40 which extends from the table base 12 and is pivotally secured thereto. The clevis end of the cam clevis 34 presents a bearing surface to the sperical washer 44 which is contoured to form a cam surface 36, the rise of which increases as the clevis is turned clockwise as shown in FIGS. 2 and 3. A tongue 42 extends from the cam clevis 34 and is pivotally joined to a piston 46 of a hydraulic cylinder 20 which is pivotally mounted by suitable means to the to the table base 12.

In operation the clamping apparatus assumes either a clamped position as shown in FIG. 3 or an unclamped position as shown in FIG. 2 and may be actuated by suitable external controls (not shown). To actuate the clamping apparatus from the unclamped position to the clamped position, the hydraulic cylinder 20 is activated to retract its piston 46 which applies a force to generate a turning moment on the cam clevis 34 about a pivot point 37 to increase the rise of the cam surface 36, thereby transmitting a pushing force through the spherical washer 44 to deflect the member containing the lower jaw 25. The cam surface 36 is contoured so that this pushing force always acts normal to the force of the resulting moment acting at the cam surface 36 and thereby persists when the turning moment ceases to exist for any reason. The incremental increase in the rise of the cam surface 36 is simultaneously translated through the pivot point 37 and the eyebolt 30 as an equal and opposite deflection of the member containing the upper jaw 24 due to a pulling force exerted through the nut 32 and spherical washer 44 which is equal and opposite to the pushing force acting on the member containing the lower jaw 25. Therefore, the simultaneously applied push-pull forces causing the deflectable members of the clamp to deflect an equal amount in opposite directions thereby causes the upper and lower jaws 24 and 25 to impress an equal and opposite clamping force on each side surface 28 of the annular clamping ring 26, to clamp the spindle table 14. To actuate the clamping apparatus from the clamped position to the unclamped position the hydraulic cylinder 20 is activated to extend its piston 46 which applies a force to generate a turning moment on the cam clevis 34 about pivot point 37 to decrease the rise of the cam surface and thereby remove both the pushing and pulling forces from the deflecting members which assume a no-load position due to their resiliency and thereby the clamping jaws 24 and 25 are removed from the side surfaces 28 of the annular clamping ring 26 to unclamp the spindle table 14.

It should be readily appreciated by those skilled in this art that the clamping apparatus of a rotary table assembly embodying this invention applies clamping forces which are equal and opposite so as not to influence the loading or orientation of the spindle table 14. Furthermore the forces applied by the clamping jaws 24 and 25 persist upon removal of the actuating force therefore providing fail safe operation inasmuch as the clamping jaws 24 and 25 will remain clamped even if the hydraulic cylinder 20 fails. This prevents possible damage to the workpiece or machine tool apparatus which would otherwise occur if the table inadvertently shifted position upon release of the clamping jaws 24 and 25 while machining operations were being carried out. Because the control of the push-pull action ultimately used to close the clamping jaws 24 and 25 is actuated by a turning moment applied to the cam clevis 34, the portion between the centers of the tongue 42 pivot point and the clevis pivot point 37 acting as the lever arm, a mechanical advantage of considerable magnitude is available. This mechanical advantage permits the cooperating elements of the clamping apparatus to be reduced in size, minimize manufacturing expense and facilitate its installation within the space limitations of rotary table assemblies.

It should be understood that the present disclosure has been made only by way of example and that numerous changes in details of construction and the combination and arrangement of parts may be resorted to without departing from the true spirit or scope of the invention and should be construed as illustrative rather than limited.

What is claimed is:

1. A rotary table apparatus comprising:
   a table base;
   a table mounted to said table base, said table including means for providing a double sided clamping surface;
   two deflectable members each said deflectable member being disposed to engage one side of said double sided clamping surface means when deflected;
   an eye bolt extending through apertures in said deflectable members and secured at one end;
   a pivotal mounting means for sustaining rotation about the center of the eye of said eye bolt;
   a clevis pivotally secured through the eye of said eye bolt and to said pivotal mounting means, said clevis having a tongue connected thereto and a cam surface capable of rotation about the center of the aperture in said clevis, said cam surface being disposed to exert forces against one of said deflectable members and being contoured to provide an overcenter location of said clevis; and
   a hydraulic cylinder having a telescoping piston pivotally connected to said tongue, whereby lateral movement of said piston generates a moment to rotate said cam surface to impress a pushing force on one of said deflectable members and simultaneously translates the resulting force therefrom to cause an equal and opposite pulling force on the other of said deflectable members through the cooperation of said eye bolt, and at the overcenter location of said clevis the deflectable members are sustained in a deflected position without the pushing force of said piston.

2. The apparatus of claim 1 wherein said pivotal mounting means includes:
   a rigid link secured pivotally to said table base and having a pivotal bearing surface in alignment with the eye of said eyebolt.

3. The apparatus of claim 1 wherein said double sided clamping surface means comprises an annular clamping ring the opposite sides thereof being said double sided clamping surface.

* * * * *